Patented July 18, 1950

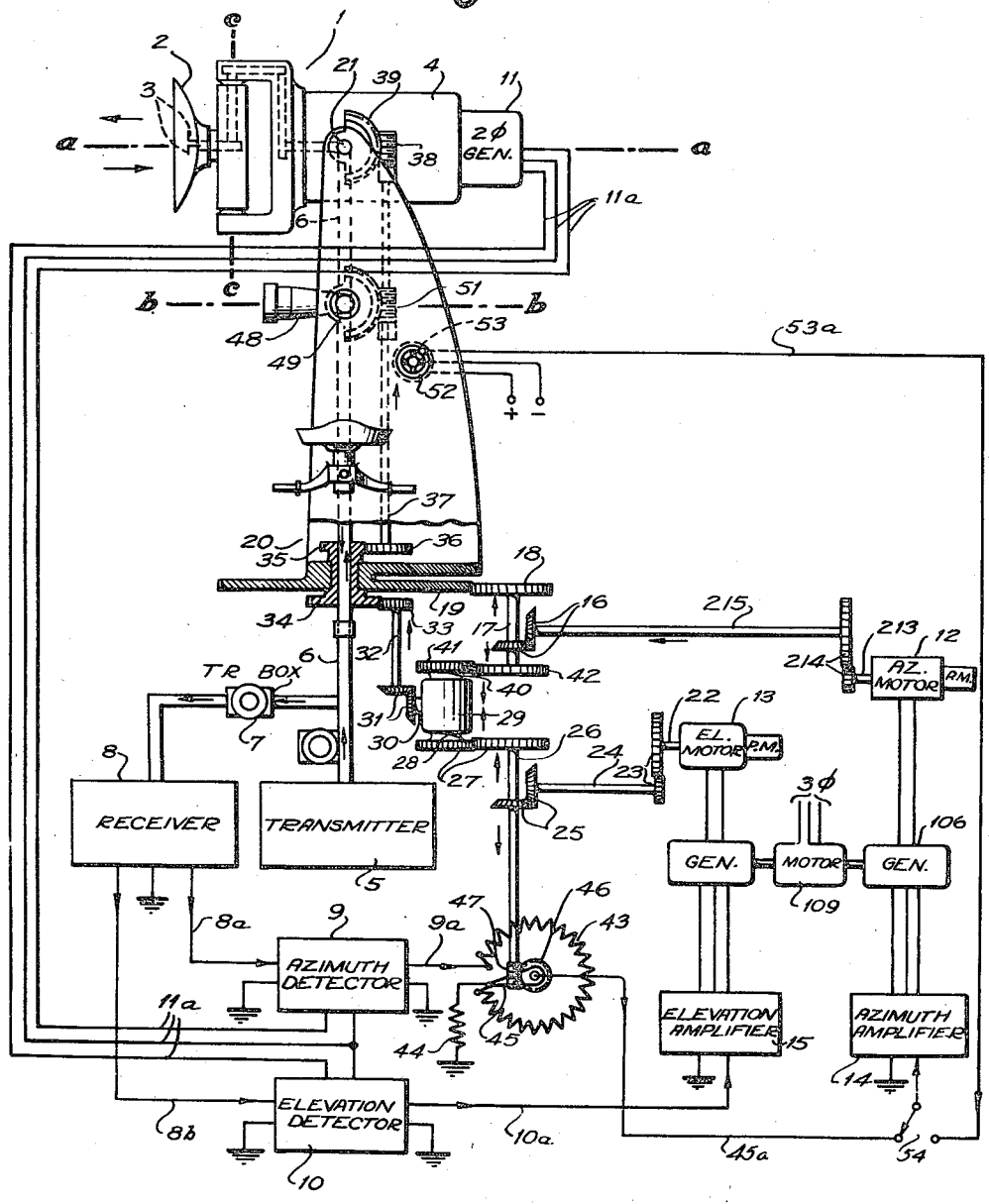

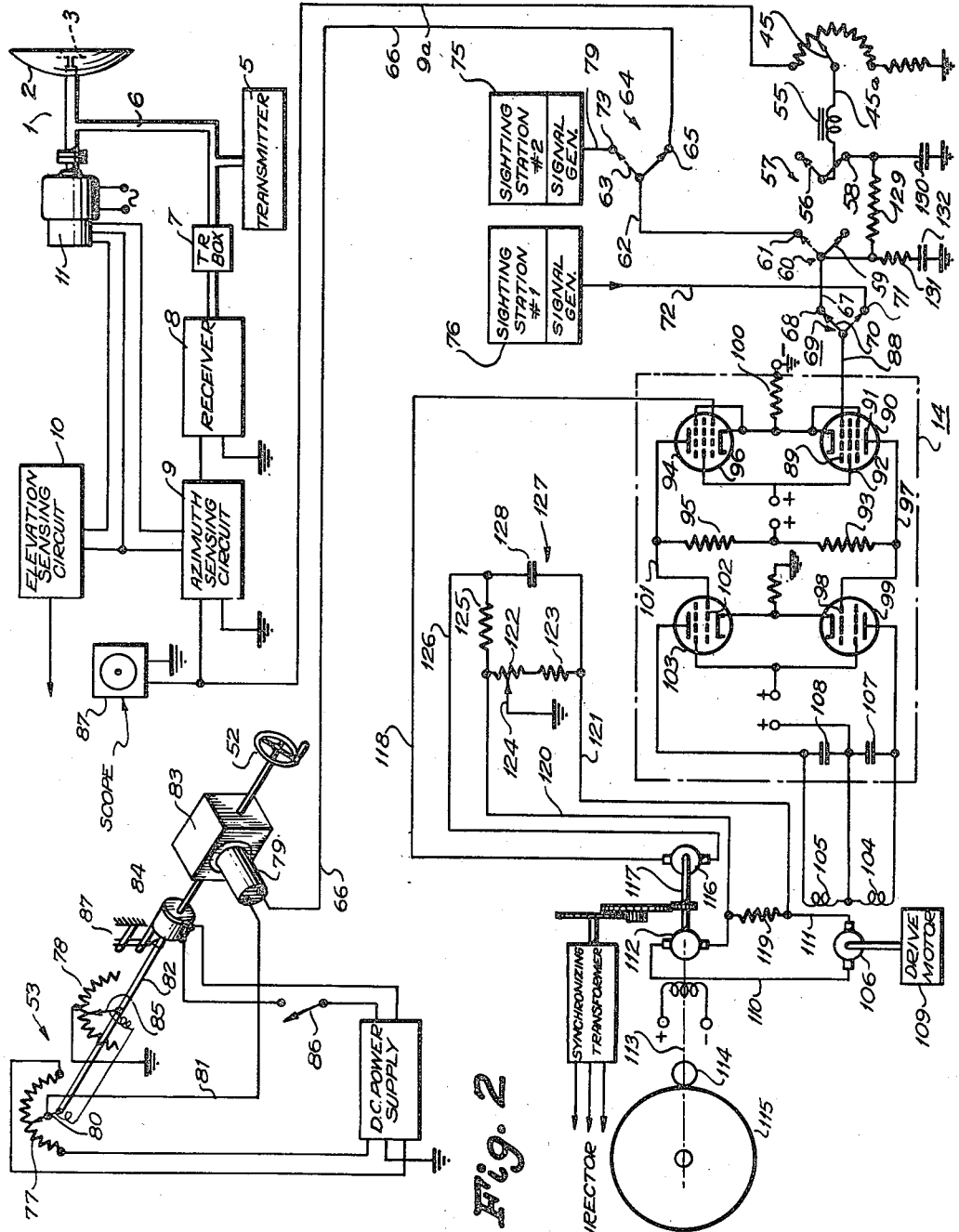

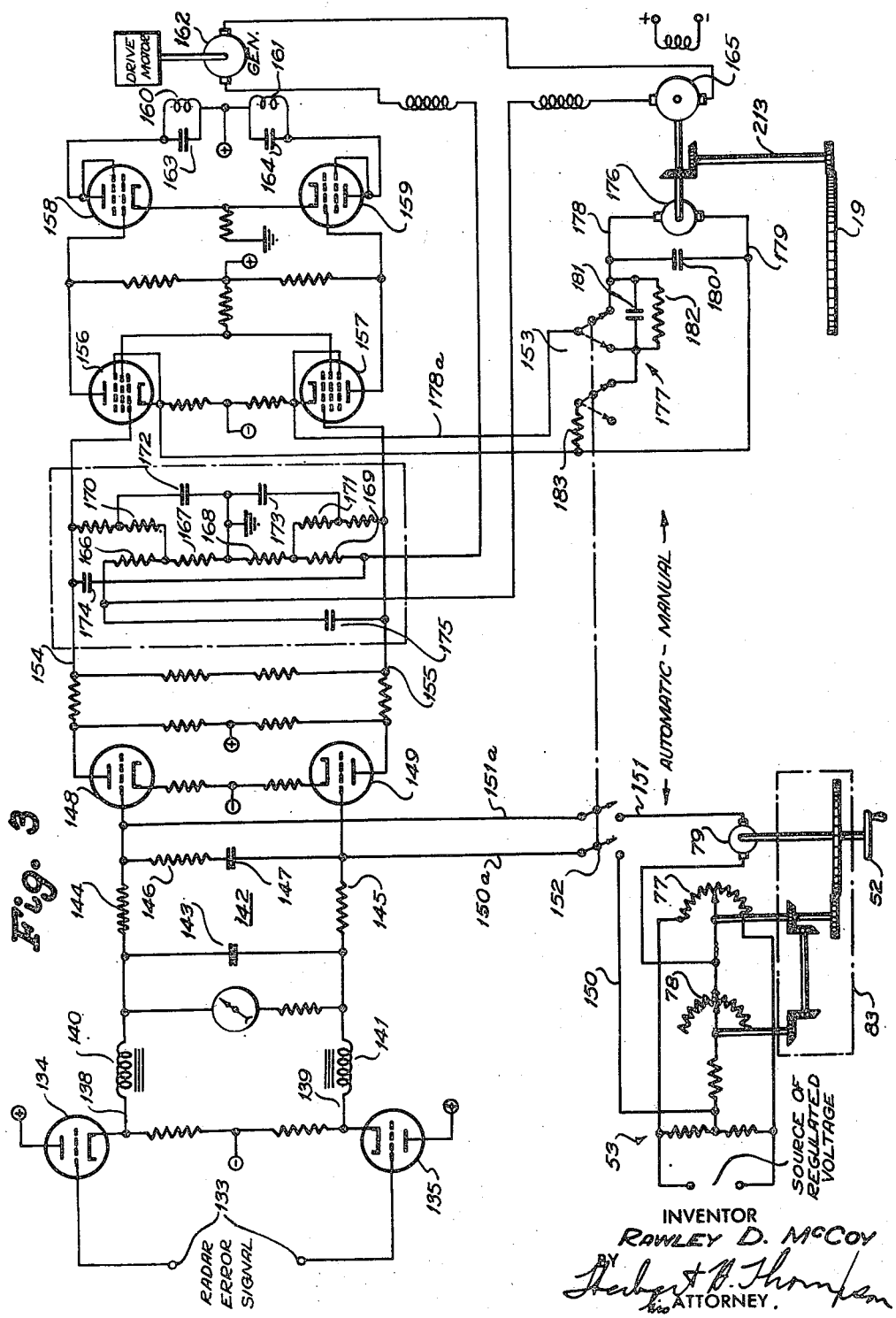

2,515,248

UNITED STATES PATENT OFFICE 2,515,248

SERVOMOTOR SYSTEM

Rawley D. McCoy, Bronxville, N. Y., assignor to The Sperry Corporation, a corporation of Delaware Application May 10, 1945, Serial No. 593,049

25 Claims. (Cl. 318—144)

My invention generally relates to a combined radio and optical tracking system, and, more specifically, it relates to an electronic control circuit which is particularly adapted for controlling the operation of a servo motor for driving a target-tracking device in azimuth and in elevation under control of an error signal which may be derived from the radio circuits associated with the radio tracking device or from a manually controlled source of signal voltage used with the optical sight of the tracker. A radio and optical tracker or tracking device is designed so that the directivity axis thereof, whether a radio or optical axis, may be automatically or manually controlled accurately to track a target, such for example, as an aircraft and to determine the relative angular position of the target.

This application is a continuation-in-part of the pending application of Joseph H. Lancor, Frederick R. Marindin and Rawley D. McCoy, Serial No. 499,216, which was filed in the Patent Office on or about August 19, 1943.

It is the primary object of the present invention to provide a servo system comprising an improved electronic control circuit for controlling the operation of a servo motor in which means are provided whereby to render the system operable in a stable manner smoothly to track at relatively slow speeds and under varying load conditions.

More particularly, it is a primary object of the present invention to provide a servo system in which one of the control signals is dependent upon the torque or upon some function of the torque exerted by the servo motor.

Another object resides in providing a servo system comprising a generator controlled servo motor in which one of the control signals is proportional to the armature current in said motor generator circuit.

Another object resides in providing a servo system including a generator controlled motor, an electronic control circuit for controlling the output of the generator, and a feedback circuit for controlling the output of the circuit by means of which a signal proportional to motor torque is supplied in a regenerative fashion to the control circuit.

A further object resides in providing a system of the character last above referred to, in which a signal proportional to torque rate is supplied in a degenerative fashion to said electronic control circuit.

A still further object resides in providing a system of the character last above referred to in which a signal proportional to a time integration of the signal proportional to motor torque is supplied in a regenerative fashion to said control circuit; and still another object of the present invention resides in providing such a servo system in which the output of the electronic control circuit and, in turn, the output of the generator is controlled by feedback signals including signal components proportional to torque, torque rate and torque integral, and also a signal proportional to servo motor rate as a velocity damping control voltage.

With the foregoing and other objects in view, my invention includes the novel elements and the combinations and arrangements thereof described below and illustrated in the accompanying drawings, in which:

Fig. 1 schematically represents a combined radio and optical tracker including the associated operative servos and control circuits therefor;

Fig. 2 is a wiring diagram illustrating one embodiment of the servo motor control circuit of the present invention; and Fig. 3 is a wiring diagram of a modified form of control circuit.

As hereinabove indicated, the present application constitutes a continuation-in-part of pending application Serial No. 499,216 wherein is illustrated and described, and reference may be made thereto for a fuller and more complete disclosure, a radio-optical tracker including a radio sight and an optical sight which are mounted to move together and simultaneously in azimuth and elevation with their respective directivity or sight axes substantially coincident or at least parallel. The radio sight includes a directional antenna and an indicator actuated by circuits connected with the directional antenna so that the indicator will show the position of a target relative to the directivity axis of the antenna. The indicator of the radio sight and the eyepiece for the optical sight are arranged adjacent a control handwheel whereby the operator may optionally view either the indication of the target provided by the radio sight or use the eyepiece of the optical sight in order to determine the direction in which the tracker should be moved to direct its directivity axis toward the target.

Since the present application relates to a servo system including a signal voltage amplifier which is particularly adapted for providing a desired, smooth and stable operation of the servo motor under either manual or automatic control, I have herein disclosed in a somewhat schematic manner one form of radio and optical tracking device which is equivalent to and functions in substantially the same manner as the device shown in said application Serial No. 499,216. Furthermore, since the control circuits or signal voltage amplifiers for the elevation and azimuth servos may be identical and in view of the fact that the present invention resides in the electronic control, one servo, signal voltage amplifier and associated sources of signal voltage are herein illustrated and described.

In Fig. 1, 1 indicates generally a scanner comprising a parabolic reflector 2, which functions in conjunction with the antenna 3 to transmit radiant energy preferably in the form of a directional beam. The antenna 3 is employed both as a transmitting and receiving antenna, and is disposed substantially at the focus of the parabolic reflector. The reflector and its associated antenna are mounted for rotation about a spin axis $a-a$, the spin axis being assumed in the present application to constitute the directivity axis of the scanner, a motor 4 serving to rotate the parts about said spin axis.

It is assumed for purposes of explanation that the scanner is arranged to provide conical scanning. That is, the transmitting antenna is either mechanically or electrically displaced from the focus of the parabolic reflector, so that the axis of the transmitted beam describes a cone as the scanner rotates about the spin axis $a-a$. Herein, it is assumed that this displacement is obtained by rotating the reflector slightly about the axis $b-b$ and locking it in displaced position, the axis of the reflector therefore will lie at a small angle with respect to the spin axis $a-a$.

For purposes of scanning with ultra high frequency energy, either the transmitter or the receiver, or both, may have directional characteristics, and in the present case it is assumed that the scanner comprises a transmitting and receiving antenna of a directional character.

A transmitter 5 of ultra high frequency energy, which ordinarily is modulated with a short pulse, is connected through wave guide 6 to the radiator or transmitting antenna 3. Since the scanner is continuously rotated about its spin axis, the beam of radiated energy will describe a cone about the spin axis $a-a$, and any target which appears within the scope of the cone so described or in the path of the transmitted energy will reflect energy to the antenna of the scanner. The energy so received is transmitted through wave guide 6 and through a T—R box 7 to a suitable receiver. The T—R box may be of any desired construction and functions to reject signals of high intensity, such as those in the output of the transmitter, and to pass low intensity signals. Therefore, the reflected energy which is picked up by the receiving antenna and no energy directly from the transmitter will be supplied to receiver 8.

The reflected radiant energy which is supplied to receiver 8 is in the nature of a voltage which is a measure of the error angle or the angle between the directivity axis of the scanner and the direction therefrom to the target. The receiver 8 amplifies this error voltage and, since the scanner is operable or rotatable in two dimensions, azimuth and elevation, the amplified signal is resolved into its two azimuth and elevation error components, and these two components are employed respectively to control the elevation and azimuth servos which serve to position the directivity axis of the scanner in space. Hence, the signal voltage output from receiver 8 is supplied through conductors 8a and 8b to azimuth and elevation detectors or sensing circuits indicated respectively at 9 and 10.

In conical scanning, the strength of the reflected or received energy, that is, the amplitude of the voltage of the received energy, depends upon the position of the target or source of energy relative to the axis of the radio beam pattern. Since the beam pattern is rotating in a conical path, the reflected energy varies in strength as the beam pattern rotates. Thus, the envelope of the reflected energy wave received by the antenna varies in amplitude at a frequency corresponding to the spin frequency of the scanner and the amplitude of the envelope depends upon the amount of displacement of the target relative to the directivity axis, that is, the spin axis of the scanner in the present disclosure. It is to be noted, furthermore, that the phase relation of the variations in the envelope depends upon the direction of the displacement of the target relative to the directivity axis.

Therefore, the error signal supplied to the receiver 8 is resolved into its two components, elevation and azimuth error, by comparing the phase relation of each signal with respect to some reference phase. For this purpose, a two-phase generator 11 is driven in synchronism with the spin motion of the scanner preferably by the motor 4, said generator comprising windings electrically displaced by 90°. Under these conditions, the generator develops voltages or reference voltages for resolving the error voltage supplied for receiver 8 into its azimuth and elevation components. These reference voltages may be considered as corresponding to azimuth and elevation components of the direction in which the axis of the beam pattern is displaced relative to the directivity axis of the scanner at any instant. Such reference voltages are respectively supplied to the azimuth and elevation sensing circuits through conductors 11a, one voltage being supplied to the azimuth sensing circuit and the other thereof to the elevation sensing circuit.

The phase of the reference voltages supplied to the sensing circuits 9 and 10 are respectively compared with the phase of the variations in the envelope of the received or reflected energy. By effecting a comparison in this manner and separately with respect to what may be termed "elevation and azimuth reference voltages," the azimuth and elevation components of the measured displacement may be obtained. In other words, the magnitude of the azimuth and elevation error will be proportional to the magnitude of the voltage supplied in the output of the azimuth and elevation sensing circuits.

These elevation and azimuth error voltages are employed respectively to control the operation of the elevation and azimuth servo motors 12 and 13. The voltage outputs of the elevation and azimuth sensing circuits are respectively supplied to signal voltage amplifiers 14 and 15, the constructions of which will be hereinafter specifically described, and the outputs of these amplifiers serve to control the respective servo motors.

The azimuth servo motor is arranged to move the scanner about a vertical axis in azimuth in accordance with the azimuth error, while the elevation servo is designed to move the scanner about a horizontal axis to correct for elevation errors so that the directivity axis of the scanner may be placed in coincidence with the direction of a selected target. As schematically illustrated in Fig. 1, the azimuth servo 12 has its output shaft 213 connected through gears 214, shaft 215 and bevel gears 16 to shaft 17 which, in turn, drives gear 18 meshing with gear 19 secured to the support 20 for the scanner. It will be understood that the support 20 is suitably mounted for rotation in azimuth and preferably mounted to rotate about a vertical axis which lies coincident with the axis of wave guide 6. The parabolic reflector and antenna are pivotally supported as indicated at 21 on the support 20 for movement relative thereto in elevation.

The elevation servo functions to rotate the scanner about its horizontal axis 21 through the medium of its output shaft 22 which is connected through gears 23 to shaft 24, bevel gears 25 to shaft 26 and pinion gears 27 which drive one input shaft 28 of a differential 29. The output 30 of differential 29 drives bevel gears 31, shaft 32 and pinion gear 33 which meshes with gear 34 mounted coaxially with the azimuth axis of the support 20 or the wave guide 6. Gear 34 may be formed integral with gear 35 or secured thereto in any desired manner, gear 35 meshing with gear 36 and serving to drive shaft 37 to which is secured worm 38. Worm 38 meshes with sector wheel 39 which is secured to the scanner and serves to rotate it in elevation about its horizontal axis 21.

From the schematic disclosure of Fig. 1, it will be observed that some compensating means must be provided to prevent actuation of the scanner about its horizontal axis when the azimuth servo alone is caused to operate. For this reason, the differential 29 is interposed in the transmission between the elevation servo and gear 34. The second input 40 to the differential is connected through gears 41 and 42 with shaft 17, which shaft constitutes one element of the transmission between the azimuth servo and the scanner support. The differential 29 is so arranged and the gear ratio so designed that when the azimuth servo operates to move the scanner in azimuth about its vertical axis, the azimuth servo will drive the input 40 to the differential, thereby causing gears 34 and 35 to rotate in synchronism with the support 20. Therefore, when the azimuth servo alone operates to drive the scanner in azimuth, azimuth motion only of the scanner will result, and no vertical motion or motion thereof in elevation about its horizontal axis 21 will be imparted thereto.

From the foregoing, it should be understood that the error voltages which are derived from the scanner and which are measures of the angular displacement between the directivity axis of the scanner and the direction toward a selected target, serve respectively to control the azimuth and elevation servos to move the scanner in a direction tending to zero the errors. In order that the azimuth servo, when controlled by the azimuth error voltage component derived from the scanner, shall have substantially the same response under all operating conditions of the scanner or shall not be comparatively "loose" or "sluggish" in response under some conditions and unstable or "jittery" under other conditions, a correction is introduced in the servo system so that the response of the servo will be substantially the same for all positions of the scanner in elevation. The true output value of the azimuth servo is measured in a horizontal plane. If the directivity axis of the scanner lies horizontally, the error measured thereby will be a true measure of error in a horizontal plane. Obviously, if the scanner measures the error in a slant plane, a signal which is inaccurate in magnitude will be supplied to control the azimuth servo, and the sensitivity of the error measuring means will vary substantially as an inverse function of the secant of the angle of elevation of the directivity axis of the scanner. In order to correct for this undesired variation in sensitivity, the voltage output of the azimuth sensing circuit 9 is applied across a secant potentiometer 43 and resistor 44 which is connected in series with the potentiometer and to ground. The secant potentiometer, of course, comprises a resistor so wound that the voltage output obtained therefrom by means of a wiper varies approximately as the secant of the angle the wiper is turned through, and varies between some fractional part of the voltage impressed across the potentiometer and series resistor and its full value. In other words, the position of the wiper being a measure of an angle, the voltage picked off the potentiometer will equal the product of the voltage impressed across resistor 44 and the secant function of the elevation angle. The wiper arm 45 of the potentiometer is driven by means of worm wheel 46 which, in turn, is driven by worm 47 mounted to rotate with shaft 26. The position of wiper 45 will therefore depend upon the angle of elevation of the directivity axis of the scanner, and for zero elevation angle the wiper will occupy the position illustrated in Fig. 1. As the scanner is rotated in elevation, wiper arm 45 will rotate along the secant potentiometer until the upper limit or the opposite end of potentiometer is reached corresponding preferably to an elevation angle of 80°. Since the secant of an angle approaches infinity as the angle approaches 90°, a practical range extends from zero degrees to about 80°. The wiper 45 is electrically connected through conductor 45a to the azimuth amplifier as hereinbefore indicated. In comparison, of course, the elevation sensing circuit 10 is connected directly with the elevation amplifier through conductor 10a.

As hereinbefore indicated, the servo motor control circuit of the present invention is designed and arranged to control the servo motors under automatic and manual tracking conditions. I have hereinabove described one form of automatic tracking device, and in the following will describe the optical system associated therewith. Mounted on the support 20 is an optical sight 48 which comprises an eyepiece 49 arranged with its axis coincident with the axis about which it is supported to rotate in elevation relative to the support 20. The sight 48 is secured to and rotated by a toothed sector 50 which is rotatably supported on the support 20 and driven by a worm 51 mounted on shaft 37 hereinbefore described. With this arrangement, the optical axis b—b of the object lens of sight 48 lies at all times substantially parallel with the directivity axis a—a of the scanner, and both of these axes are moved in elevation in synchronism. The operator may visually direct the scanner toward a selected target since the axes of the optical and radio sight are substantially coincident for distant targets, and thereafter the scanner may serve automatically to maintain this directivity axis substantially on the target. Either automatic radar control or manual control using the optical sight may be employed in tracking the target with the device hereinabove described.

The handwheel 52, mounted on the support 20, is manually operable in conjunction with either the radio or the optical sight to control one of the servo motors, as for example, the azimuth servo as herein shown and described. A second handwheel, not illustrated, and which may be operated in conjunction with a second sight, also not herein illustrated, may be employed in controlling the other or elevation servo. Ordinarily, two operators are employed to control the scanning device herein shown. The details of the control operated by the handwheel 52 is shown in Fig. 2 and will be hereinafter described. However, in connection with Fig. 1, it will be observed that the signal voltage output of the signal-producing device 53, controlled by the handwheel 52, is supplied through conductor 53a through switch 54 to the azimuth amplifier. In Fig. 1, I have illustrated a simple form of switch 54 which may be operated to connect the manual control system, or, alternatively, the radio control system in circuit with the azimuth amplifier. However, in Figs. 2 and 3, I have illustrated preferred arrangements whereby manual or automatic control of the servos may be effected at the discretion of the operator. In either case, of course, the servos are controlled through the signal voltage amplifiers 14 or 15 by means of an error signal voltage.

The present invention specifically relates to the servo motor control circuit which is designed to amplify the error signal voltage derived either from the scanner or from the handwheel-operated devices and to mix therewith other signals which are generated and connected to the amplifier in the manners hereinafter described so that servo motors will have operating characteristics particularly adapting them for use with automatic and manual tracking.

As shown in Fig. 2, the error signal voltage which is derived in the azimuth sensing circuit from the error voltage supplied to the output of the receiver, may be supplied to the amplifier, or, the error voltage may be derived from the handwheel-operated, signal-supplying device indicated generally at 53. In Fig. 2, only sufficient radar equipment and associated circuits are shown as to provide a schematic representation of the path traversed by the signal voltages from the antenna to the input of the amplifier, and the various parts and circuits thereof bear the same reference characters as the corresponding parts and circuits illustrated in Fig. 1. In Fig. 2, the wiper 45 of the secant wound potentiometer is connected through conductor 45a and choke 55 to the contact arm 56 of switch 57, one terminal of which is open and the other terminal 58 of which is electrically connected with the contact arm 59 of a second switch 60. As indicated, these two switches are adapted to be operated jointly so that when the arm 56 of switch 57 engages the open contact, the arm 59 of switch 60 engages contact 61 which is connected through conductor 62 to the contact arm 63 of another switch 64. One contact 65 of switch 64 is connected through conductor 66 to the output of signal voltage-supplying device 53 which is controlled by the handwheel 52. The switch arm 59 of switch 60 is connected through conductor 67 to one contact 68 of a switch 69, the contact arm 70 of which is connected to the input of the amplifier 14. The other contact 71 of switch 69 is connected through conductor 72 to the signal voltage generator of a first remote sighting station in a manner similar to that in which the contact 73 of switch 64 is connected through conductor 74 to the signal voltage generator of a second remote sighting station.

It will be observed that the above-described group of switches may be operated selectively to supply a control signal from either a radio scanner, manually controlled handwheel-operated device, or from the signal voltage generator associated with the additional sighting station which are indicated at 75 and 76 in Fig. 2. The resistance-condenser network connecting the switches 57 and 60 will be hereinafter described and the purpose thereof fully set forth. It is obvious from an examination of Fig. 2 that if all of the switch blades of the switches occupy the full-line positions therein illustrated, a control signal voltage from the radar system will be supplied to the input of the amplifier 14. If switches 57 and 60 be simultaneously operated to the dotted line positions, the radar system will be disconnected from the amplifier and the signal-supplying device 53, operated by handwheel 52, will be connected to the input of amplifier 14. With the switches 57 and 60 in the position last described, the signal from the device 53 may be interrupted and the remote sighting station 75 operatively connected with the amplifier by throwing switch arm 63 to the dotted line position. Furthermore, the switch arm 70 of switch 69 may be operated to the dotted line position to interrupt the circuit from either the remote station 75 or the device 53, and to connect the input of the amplifier with the remote station 76. Hence, the group of switches shown in Fig. 2 serve to afford selective connection of the amplifier with any sighting station or type of sighting device, whether optical or radar.

For exemplary purposes, I have shown the device 53, which is actuated by the handwheel 52, in more or less schematic detail, in order to teach one manner in which the operation of the servos may be manually controlled. The device 53, generally speaking, comprises a pair of potentiometers 77 and 78 and a permanent magnet generator 79 which are all actuated by the handwheel 52.

It has been found in practice that an operator may more accurately and easily track a target when the control which he operates provides an aided tracking type of control over the servo. An aided tracking control is effected when the control handle, for example, is positionable not only to provide a signal which controls the rate of operation of the servo, but which also supplies a signal which is proportional to the rate of displacement of the control and which provides a proportional displacement in the output of the servos which greatly aids in synchronizing the tracker with the target. For distance targets which have relatively low angular velocities, tracking may best be accomplished with apparatus providing either pure displacement tracking or a high ratio of displacement to rate tracking. When the target is relatively near and has high angular velocities, it is then desirable to provide a relatively greater amount of rate tracking, or, to decrease the ratio of displacement to rate tracking. The manual control herein shown provides an electrical, variable ratio aided tracking system in which the ratio of displacement to rate tracking of the aided tracking system decreases as the operator displaces the handwheel from its central or neutral position.

The servo motors, of course, drive the tracker at a rate dependent upon the voltage of the tracking signal or the signal derived from the device 53, the rate tracking component of the voltage is dependent upon the displacement of the handwheel or is derived from the potentiometer 77 while the displacement tracking voltage component is proportional to the rate of movement of the handwheel and is derived from the generator 79. The ratio of these voltages is controlled by the secondary potentiometer 78.

Potentiometer 77 is connected across a suitable source of D. C. supply and its wiper 80, which is connected through conductor 81 in series with generator 79, is carried by shaft 82. This shaft is driven from the handwheel 52 through a gear box 83 and a magnetic clutch 84. Generator 79 is similarly driven from the gear box 83 and the gearing therein proportions the relative rates or displacements of the shaft 82 and the armature of generator 79 for a predetermined angular rotation or displacement of the handwheel 52. Movement of shaft 82 in a clockwise or counter-clockwise direction will determine the polarity sense of the signal voltage derived from the potentiometer 77 while the angular displacement thereof moving the wiper 80 from a position substantially midway between the ends of the potentiometer resistor will determine the magnitude of the voltage. The servo controlled thereby will provide a rate output proportional to the voltage derived from the potentiometer 77.

As the handwheel is operated in one direction or the other, generator 79 will supply a voltage output which is proportional to the rate of movement of the handwheel. The voltages from the potentiometer 77 and from generator 79 will be combined in the input to the amplifier controlling the servo and that voltage component which is derived from the generator will result in a displacement of the servo output providing electrical aided tracking.

In order to control the ratio of rate signal to aided tracking or displacement signal, the second potentiometer 78 is provided, the wiper 85 of which is also controlled by shaft 82 in the same manner as wiper 80. As the wiper 80 is displaced from its neutral position, the voltage output is comparatively low and as the slider is further displaced, this voltage normally increases, but since resistance of the load potentiometer 78 also increases with movement of the wiper 85 therealong, the wipers 80 and 85 being electrically connected, the voltage drop across potentiometer 77 is reduced in a non-linear fashion. Thus, the voltage output of potentiometer 77 will increase in a non-linear fashion as the wiper 80 is displaced from its central or neutral position.

Magnetic clutch 84 is connected through a switch 86 with the D. C. power supply, above referred to, and when energized is designed to connect shaft 82 with the output of gear box 83. Switch 86 is preferably designed to be automatically opened when the controller 53 is disconnected and some other controller is employed, deenergizing the magnetic clutch and allowing shaft 82 under the influence of the centralizing device indicated schematically at 87 to return the wipers 80 and 85 to a central or neutral position with respect to the resistors of the potentiometers 77 and 78.

The manual control of the scanner which entails an operation of the handwheel 52 to control one of the servos, such as the azimuth servo, and another to control the elevation servo, may be accomplished in conjunction with optical sight 48. Additionally, this control may be employed in connection with a scope or cathode ray tube, one of which is indicated generally at 87. The scope or indicator 87 is connected to receive a voltage from the output of the azimuth sensing circuit (another may be connected across the output of the elevation sensing circuit) and is adapted to provide on its screen an indication of the azimuth displacement of the directivity axis of the radio scanner, such as axis a—a or of axis b—b of the optical sight relative to the direction therefrom to a preselected target. Hence, the operator may use either the scope in connection with the radio tracker to provide him with a visual indication in controlling the tracker to track a target or he may employ the optical sights. In either case, the control is the same.

The signal error voltages derived from the radio system and appearing across the output of the sensing circuits or the voltages derived from the device 53 or the devices 75 or 76, as selected by the operator, which constitute azimuth and elevation control voltages, are respectively employed to control the azimuth and elevation servos. I have herein shown the various controls for providing an azimuth signal voltage and disclosed the azimuth servo amplifier for the purpose of illustration, it being understood that a similar arrangement will be provided to control the elevation servo.

Whichever controller is employed, its voltage output is supplied through conductor 88 to grid 89 of tube 90. The plate 91 and screen grid 92 of tube 90 are connected to a suitable power supply as indicated. The output of tube 90 will appear as an amplified voltage across the load resistor 93. Tube 94 has its plate connected through load resistor 95 to the source of positive supply above referred to, and similarly its screen 96 is connected with the screen grid of tube 90. When a signal is applied to grid 89 of tube 90 an amplified signal of opposite phase appears across resistor 93 and is supplied through lead 97 to the grid 98 of tube 99. The variation in current through tube 90 caused by the signal on its grid varies the drop across cathode resistor 100 which, in turn, changes the bias of tube 94, producing an amplified voltage across load resistor 95 which is of the same phase as the signal applied to the grid 89 of tube 90. The phase of the voltage across load resistor 95 is therefore opposite to that of the voltage on lead 97 and is supplied by lead 101 to the grid 102 of tube 103.

The balanced output of the first stage of the amplifier comprising the tubes 90 and 94 varies the current in tubes 99 and 103 comprised in the second stage of the amplifier, the current variation being dependent upon the polarity and magnitude of the tracking signal voltage appearing on lead 88 or across the input of the amplifier. The cathodes of tubes 99 and 103 are connected together and through a suitable cathode resistor to ground in the conventional manner, while the screen grids of these two tubes are similarly connected in the usual manner to a source of suitable positive potential. The plates of tubes 99 and 103 are connected through opposite halves 104 and 105 of the field winding of generator 106 to a source of positive potential as shown. Condensers 107 and 108 are preferably connected respectively across the two halves of generator field windings. These condensers are employed to prevent oscillations in the amplifier which may arise by virtue of its high gain and, also, these condensers serve to by-pass alternating voltage components in the output of the amplifier.

The generator 106 is driven by a suitable motor 109 preferably of the constant speed type. The field of the generator windings 104 and 105 will be controlled by the signal voltage supplied to the amplifier, the generator field having a direction and magnitude which is dependent upon the polarity sense of the control signal voltage and its magnitude. The output voltage of the generator is therefore dependent upon the signal voltage applied to the amplifier and the output of generator 106 is connected through leads 110 and 111 to the armature of a servo motor 112, corresponding for example to servo motor 12 in Fig. 1, preferably having a constantly excited or fixed field as indicated, the field of motor 112 being preferably energized from a suitable D. C. source. Under these conditions, the armature of motor 112 will be driven at a rate dependent upon the voltage applied across its terminals. Hence, since the rate of motor 112 is dependent upon the voltage output of generator 106 which, in turn, is dependent upon the signal voltage applied to the amplifier 14, motor 112 will drive in a direction and at a rate depending upon the polarity and magnitude of the tracking error voltage signal applied to the input of amplifier 14. As shown, the armature of motor 112 drives shaft 113 to which gear 114 is secured and which meshes with gear 115.

The schematic showing of motor 112 and its associated driving mechanism for rotating gear 115 is representative of the corresponding arrangement of Fig. 1. That is to say, servo motor 112 corresponds to the azimuth servo 12 while gear 115 corresponds to gear 19 of Fig. 1, the shaft 113 and gear 114 corresponding to the shafting and gears 213—215 and 16 through 18. It will, of course, be understood that any suitable form of amplifier may be substituted for that described in the above.

For stabilization purposes, a voltage proportional to the rate or output velocity of the servo motor 112 is generated by a permanent magnet generator 116 which, as schematically shown, is connected through shaft 117 with the servo motor 112. The voltage generated by generator 116 is supplied through lead 118 to the control grid of tube 94. The polarity of this rate voltage is selected so that it will act in a degenerative sense in the amplifier. An amplified voltage will appear across load resistor 95 which corresponds to the voltage applied to the control grid of tube 94, and variations in the current in tube 94 due to the voltage applied to its control grid cause changes in the voltage drop across resistor 100 thereby changing the bias of tube 90, causing a correspondingly amplified voltage to appear across load resistor 93.

The amplifier, as hereinabove described, produces balanced output voltages across load resistors 93 and 95 which comprise components corresponding to the tracking signal voltage input to the amplifier and also to the velocity or output rate of the servo motor 112. An inverse feedback of a speed or rate voltage as above described is sometimes termed velocity damping, in that it functions to oppose changes in the speed of the servo motor.

Although velocity damping voltages tend to stabilize the operation of a variable speed servo, they introduce other factors which tend toward instability. It is well known that an inverse feedback system will oscillate at a frequency when the phase shift is at least 180° and the gain is greater than unity, whereupon the feedback becomes regenerative rather than degenerative. One solution to avoid this difficulty is to provide a means for attenuating the gain of the servo system in the zone of frequencies where oscillations may occur. In accordance with the present invention, I propose to effect this attenuation by introducing a second degenerative signal into the amplifier, which signal depends upon the rate of change of the torque exerted by the motor. This arrangement tends to oppose changes in the motor torque and hence substantially to attenuate the gain of the circuit or servo system in those frequency zones at which oscillation might otherwise occur.

A voltage corresponding to the torque of the motor may be obtained by placing an impedance, such as resistor 119, in series between the armatures of generator 106 and motor 112. Since the current drawn by the armature of motor 112 is a measure of its torque, the IR drop across the resistor 119 provides a voltage proportional to the torque developed by the motor 112. The resistor 119 is preferably small in comparison with the resistance of the armatures of generator 106 and motor 112 in order to avoid an undesirable voltage drop in the circuit.

The voltage appearing across resistor 119 is connected through leads 120 and 121 across the series resistance circuit comprising resistor 122 and 123, resistor 122 having a sliding contact 124 which is connected to ground as indicated. Therefore, the voltage on leads 120 and 121 will be of opposite polarity with respect to ground, but both voltages are dependent upon the torque of the motor 112 and the ratio of these two voltages is determined by the position of the sliding contact 124 relative to resistor 122. The primary purpose of arranging the series resistor circuit in the manner above described is for the purpose of obtaining a derivative and an integration voltage component as will hereinafter be particularly pointed out.

Conductor 120 is connected through a resistor 125 to conductor 126 which serves to connect the RC network, indicated generally at 127 and adapted to provide both derivative and integration voltage components, with the permanent magnet generator 116. Conductor 121 is also connected to conductor 126 through a condenser 128.

The voltage on conductor 121, that is, the voltage across resistor 123 and a part of 122, is differentiated in the resistance-condenser network 127, by condenser 128 supplying a voltage across resistor 125 which is proportional to a first time derivative of the voltage proportional to motor torque. The voltage across the other portion of resistor 122 is applied through resistance 125 to condenser 128 and the voltage across this condenser or the potential to which it is charged will be proportional to a time integral of the voltage proportional to motor torque. As is evident from the wiring diagram of Fig. 2, these voltages are supplied in opposite polarity sense and in series with the speed generator 116 to the amplifier 14.

The first derivative voltage appearing in the output of the network 127, as above described, is connected in series with the velocity damping voltage derived from generator 116 and fed back in a degenerative sense through lead 118 to the amplifier 14. The degenerative or inverse feedback of a voltage which is dependent upon the torque rate of a motor or rate of change of torque developed by the servo 112 attenuates the gain of the amplifier circuit at the frequency at which the servo tends to oscillate, or, at the frequency at which the phase shift would be 180° and the inverse feedback circuit would become a regenerative feedback circuit.

One difficulty encountered with this type of electrical, variable speed drive mechanism lies in the fact that the speed regulation of the motor is poor at low speeds. When the torque is increased at low speeds, the speed of the motor is reduced due to the voltage drops in the armature circuits of the motor and generator as well as the effects of armature reaction together with other losses. Obviously, in tracking systems of the character herein described, it is desirable that the speed output of the servo motor be primarily dependent upon the control signal voltage supplied to the amplifier and substantially independent of the load on the motor or the torque exerted thereby.

Heretofore, it has been proposed to provide the motor or generator of a motor generator system with compound fields. The use of a system of this character in tracking systems is not desirable because of the necessity of over compounding the fields, thereby rendering the systems unstable. It has also been proposed to utilize the voltage across the armature of the motor and generator having components including the generated voltage and the drop in the armature windings as a regenerative feedback voltage whereby to increase the field strength of the generator with an increase in motor torque. However, such a voltage, taken across the armatures of the motor and generator, contain spurious voltage components from the commutator which must be filtered in order to provide a satisfactory and useful voltage which is dependent upon motor torque. Furthermore, a filter for this purpose would necessarily have a long-time constant in order to block the undesired spurious and higher frequency signals and, of course, such a filter must necessarily reduce the sensitivity or response rate of the control circuit which is also very undesirable.

Accordingly, in the present invention, a portion of the voltage across resistor 119, which is proportional to motor torque, is supplied in a regenerative feedback fashion to the amplifier 14, whereby to increase the field strength of the generator 106 as the torque developed by motor 112 increases. This is accomplished in the following manner. The voltage between lead 120 and ground is proportional to the torque of the motor, and when the torque is constant this voltage will be added in series with the voltage generated by generator 116 and fed back regeneratively to the amplifier 14.

Since the conductors 120 and 121 are of opposite polarity with respect to ground, they may be connected through the RC network 127 to the conductor 126, as shown, to provide a torque feedback voltage which is supplied in a regenerative fashion to the amplifier and a torque rate voltage which is supplied in a degenerative fashion through the common feedback circuit to the amplifier. Only a relatively small regenerative torque voltage is necessary to maintain the desired speed regulation of the motor at slow speeds and therefore the position of the contact 124 which is connected with ground is selected to provide a relatively small voltage on the conductor 120.

As hereinbefore indicated, the RC network 127 also functions to integrate the torque voltage appearing between the conductor 120 and ground. The torque or torque integral voltage serves to improve the operation of the servo motor at slow speeds and to provide an output rate which is principally dependent upon the input control signal voltage and which is substantially independent of the load on the servo motor or the torque exerted thereby. On the other hand, the voltage produced by the RC network 127 which is proportional to a first time derivative of the torque voltage or to rate of change of torque is employed in a degenerative fashion as compared to the regenerative feedback of the torque signal voltage, and serves to permit of much greater gain in the feedback loop including the permanent magnet D. C. generator 116, thereby greatly improving the over-all operation of the servo system. The degenerative torque rate may also be considered as a rate of change of acceleration lag. Furthermore, the torque integration provided by the RC network 127 supplies a voltage output which is used in a regenerative fashion and serves to provide a more stable operation of the servo.

As hereinbefore indicated, the signal voltage between conductor 120 and ground will be applied across resistor 125 and condenser 128 which is in series therewith. Since the conductor 126 is connected to the resistance 125 and condenser 128 and at a point therebetween, an integration voltage component will be derived from the condenser 128 to function in the regenerative manner above described.

Also, as hereinbefore indicated, the switches 57 and 60 for controlling an automatic or manual operation of the tracking device has connected between the contact 58 of switch 57 and the switch arm 59 of switch 60, a resistance 129, contact 58 being connected through condenser 130 to ground and switch arm 59 being connected through resistance 131 and series connected condenser 132 to ground. This network functions to hold over the signal voltage when switching from manual control to automatic or vice versa, so that during the brief switching interval the signal voltage may persist in the input to amplifier 14 and the resultant continuous operation of the motor will maintain the radio and optical axes on the target. In other words, this network insures smooth tracking during the switching transition period.

In Fig. 3, I have illustrated a modified form of control amplifier which is adapted to control a servo motor in accordance with a radio derived signal or a signal from a manually controlled device. The control terms hereinbefore described for improving the operation of the servo system are substantially the same as are derived in the system of Fig. 2, but it will be observed that the amplifier of Fig. 3 is a balanced push-pull amplifier in which torque, torque rate and torque integral, error integral and velocity voltage terms are introduced in a balanced fashion.

Referring now to Fig. 3, one input to the amplifier is represented by the terminals 133 which are adapted for connection with the output of either the azimuth or elevation sensing circuit hereinbefore described. In the present circuit, this D. C. error signal, derived from the sensing circuit, is applied across the terminals 133 which respectively are connected to the control grids of tubes 134 and 135. The signal applied across terminals 133, of course, has a polarity sense depending upon the direction of the azimuth or elevation error and is of a magnitude dependent upon the magnitude of said error. The tubes 134 and 135 in the embodiment illustrated are employed as cathode followers, the output thereof being derived from across cathode resistors 136 and 137 which are connected in series between the cathodes of the tubes for balanced operation. The output is connected through conductors 138 and 139 and chokes 140 and 141 to an RC network indicated generally at 142. The chokes 140 and 141 together with condenser 143 serve to filter out frequencies above approximately 5 cycles per second, and this filter network may, if desired, be omitted.

The network 142 comprises the resistors 144, 145 and 146 and condenser 147. This network supplies signal voltages in its output which are proportional to the actual error or displacement and also error integral. This network also functions to attenuate high frequencies with negligible phase shift. Zero frequency or D. C. is, of course, passed without attenuation and intermediate frequencies are attenuated increasingly with higher frequencies but in all cases with a phase shift of less than 90°. The effect of this network is to cause the system to follow an average signal and to eliminate spurious signals of short duration. In other words, the response of the servo may be made to cut-off at some low frequency between ½ and 1½ cycles per second and is preferably aperiodic.

The output of the network 142 is connected across the control grids of amplifier tubes 148 and 149. The signal voltage output from the manually controlled, signal voltage supplying device 53 which may be of the character hereinabove described is also connected across the control grids of tubes 148 and 149 as shown. The manually operated, signal voltage generator 53 is illustrated as of the type hereinabove described, and corresponding parts thereof bear corresponding reference numerals. In brief, the signal voltage derived from the potentiometer 77 is connected in series with the armature of the permanent magnet generator 79 and the resultant voltage is applied through the leads 150 and 151 across the poles of a double-pole, single-throw switch 152, the contacts of which are connected through leads 150a and 151a to the output of the RC network 147 above indicated.

For automatic tracking, switch 152 is opened and simultaneously switch 153, hereinafter described, is actuated to move its two arms to the dotted line positions. By opening switch 152 only the error signal derived from the radar sensing circuit is supplied to the amplifier. However, for manual tracking, switch 152 is closed and, due to the lower impedance of the manual tracking signal source, or the device 53, as compared with the impedance of the radar error signal source, it is unnecessary to disconnect the radar error signal source from the amplifier. For example, resistor 144 and 145 would preferably have a resistance of the order of from 500,000 ohms to 2 megohms as compared with a maximum resistance value of 10,000 ohms for potentiometer 77.

As hereinbefore indicated, the rate term of the aided tracking control signal is provided by potentiometer 77 which is loaded by potentiometer 78 to render its output non-linear. The permanent magnet D. C. generator 79 serves to provide the displacement signal or aiding tracking portion of the control voltage. The values of resistance are so chosen as to provide mainly displacement control or a signal with very little rate voltage per unit turn of handwheel for small output velocities or where the contact arms of the potentiometers 77 and 78 lie near the midpoints along the lengths thereof. At higher velocities, for example, where the wipers of potentiometers 77 and 78 are adjacent an end thereof, the output is predominately a rate control with a large change in the rate signal voltage per unit of angular movement of the handwheel. It is desirable to provide the above-noted ratio of rate-to-displacement control voltages in order that the tracking device may satisfactorily track high speed targets at both long and short ranges.

The tubes 148 and 149 to which the signal voltages are supplied serve to provide high gain for the radar error and manual tracking error signals. If the level of the radar signal were to be sufficiently high, these tubes could be omitted. The plates of tubes 148 and 149 are respectively resistance coupled and connected through leads 154 and 155 to the control grids of tubes 156 and 157. The tubes 156 and 157, shown as pentodes, are provided to control the grids of tubes 158 and 159 in accordance with the desired control functions and with high voltage gain. The plates of tubes 159 and 158 are connected with the two halves 160 and 161 of the field winding of generator 162. Condensers 163 and 164 may be connected across the respective halves of the field winding of the generator to filter out undesired A. C. components. Generator 162 which is similar to generator 106 hereinabove described has its armature connected in circuit with the armature of servo motor 165 which has a fixed field as shown and which may be generally similar to the servo motor 112 of Fig. 2.

The output of the amplifier controls the direction and strength of the field of generator 162 and thereby controls the direction and rate of operation of servo motor 165. In order to introduce torque terms into the amplifier and in a predetermined controlling manner, I connect series resistors 166, 167, 168 and 169 in circuit between the armatures of generator 162 and the motor 165. As hereinabove described, the IR drop across these resistors provides a voltage which is proportional to the torque exerted by the servo motor 165. When the torque is constant, the voltage across resistors 170 and 171 will respectively be substantially the same as that across integrating condensers 172 and 173. Hence, a voltage proportional to motor torque will be supplied in a regenerative fashion across the conductors 154 and 155 and between the control grids 156 and 157. Since this voltage is supplied to the amplifier in a regenerative fashion, loading of the motor will cause a rise in armature current and an additional signal to the amplifier, whereby still further to increase the current in the motor generator circuit. This, in effect, compensates for varying load conditions without requiring a variation in the error signal supplied to the amplifier thereby improving the operation of the servo and rendering its rate output substantially independent of load or servomotor torque output. The need for this type of control is primarily for tracking at extremely slow speeds, where the motor would tend to stop and start with a varying load and this uneven tracking is mostly noticeable when under manual control.

As above indicated, condensers 172 and 173 serve in connection with the resistors 167, 168, 170 and 171 to supply a signal voltage in regenerative fashion to the amplifier which is proportional to a time integration of the torque voltage. Similarly, the condensers 174 and 175 function in connection with the resistors 166, 167, 168 and 169 to supply voltages proportional to a first time derivative of the torque voltages and to supply these error derivative or rate voltages in a degenerative fashion to the amplifier. The condensers 174 and 175 will also serve to filter out undesired and spurious voltage components or high frequency signals which might otherwise appear on the grids of tubes 156 and 157 and which in some cases might saturate the amplifier. These condensers may serve also to attenuate the servo response for frequencies above, for example, 4 cycles per second.

As compared to the network 127 of Fig. 2, which provides the signal voltages which are functions of motor torque, it will be noted that the corresponding network of Fig. 3 does not combine these signal voltage components in series with the velocity damping voltage derived from the rate generator. In the amplifier of Fig. 3, the control voltages which are functions of the motor torque are supplied to the control grids of tubes 156 and 157 while control voltages which are dependent upon the rate of the servo motor output are supplied to the cathodes of these tubes.

The control voltages which are dependent upon the rate of servo motor output are obtained from the permanent magnet generator 176 and network 177, and the voltage components so derived, being functions of motor speed, are employed for damping purposes. The servo motor 165 drives the permanent magnet generator 176, the output of which is connected across the leads 178 and 179. A condenser 180 may be connected thereacross for filtering purposes. Lead 178 is connected to one contact of a switch 153 while the other lead 179 is connected to the cathode of one of the tubes 156, 157. One of the switch arms of the double-pole, single-throw switch 153 is connected through lead 178a to the cathode of the other of the tubes 156, 157. A condenser 181 is connected in parallel with resistor 182 and connected between lead 178 and a second contact of the switch 153 which is adapted to be engaged by one of its poles for connection through a resistor 183 with lead 179.

One end of the parallel connected condenser 181 and resistor 182 is also connected with a second contact adapted to be engaged by the other of the poles of switch 153, so that this end of the parallel circuit will either be connected to lead 178a or to resistor 183. In one position of the switch poles, the parallel connected condenser 181 and resistor 182 will be connected in series between leads 178 and 178a, while for the second position of the switch poles, the parallel connected condenser and resistor will be connected in series with resistor 183 and across the leads 178 and 179.

When the poles of switch 153 occupy the full-line position shown, the preferred connection will be made for manual control of the servo, while when the switch poles occupy the dotted position, the servo will be arranged for automatic operation. With the switch poles in the first described position, a signal voltage will be supplied across the cathode resistors of tubes 156 and 157 which is proportional to the rate of the servo motor or its velocity, and this voltage functions as a velocity damping factor. At the same time, condenser 181 will be connected in series with resistor 183 across the leads 178 and 179 and will serve to integrate the velocity voltage, resistor 183 being preferably arranged so that the charge developed across the condenser 181 will be substantially equal to the voltage it would have thereacross if the servo motor 165 were operating under the same speed and under automatic tracking conditions.

When the poles of switch 153 are moved to the dotted line position, condenser 181 and resistor 182, which are connected in parallel, will be connected in series with the armature of generator 176 to provide two damping factors or a voltage proportional to speed lag and acceleration lag with integration.

The servo motor is controlled in rate and direction of operation in accordance with the magnitude and polarity or phase sense of the error signal supplied to the input of the amplifier, and it is also controlled by the voltages which are proportional to torque, rate of change of torque and torque integral which are derived and supplied to the control grids of the tubes. These signals or control voltages are mixed in the tubes 156 and 157 with the velocity damping voltages and velocity integral voltages derived from the generator 176 and associated network 177. Additionally, error voltage integration is achieved in network 142 and voltages proportional thereto are additionally supplied to the control grids of tubes 156 and 157.

An electrical servo motor system of the character herein illustrated and described is endowed with highly desirable operating characteristics when controlled in the manner above set forth and under the various control voltages herein described. Additionally, it may be noted that the inductance of the field of the generator 162 feeding the servo motor is preferably of such value, for example, 100 henries, that a filtering action is obtained which causes the output of the generator to be attenuated for frequencies say above about 20 cycles per second, due to the relatively low plate resistance of the tubes 158 and 159. This operation tends to eliminate "jitter" of the servo motor at frequencies of say from 20 to 150 cycles per second which might otherwise be caused by the D. C. permanent magnet generator 176 feeding back into the amplifier when play due, for example, to backlash in the gearing occurs, or when undesirable phase shifts occur which may be present in some part of the servo loop including the tubes 156 and 157, the output tubes 158 and 159, generator 162, servo motor 165, the gearing or transmission, the D. C. permanent magnet generator 176 and the RC network connected across the output of the generator 176 and between it and the cathode resistors of tubes 156, 157. Furthermore, stabilization is primarily provided, as hereinbefore indicated through the expedient of the velocity damping and torque rate voltages which are fed back in a degenerative fashion to the amplifier, and therefore in a manner to oppose fluctuations or changes in the speed and torque of the motor.

It is to be understood that while I have in the foregoing made reference to resistance-capacitance networks for providing derivative or integral voltage terms, that I do not wish to be restricted to the use of pure resistances, but that impedances may be employed having resistance components, and furthermore, that the rate-taking circuits may be formed in any desired manner so long as the capacitive reactance of the circuit is large compared with the impedance with which it cooperates in deriving the rate terms. In other words, the present invention is not to be limited to any particular arrangement or combination of elements for deriving voltages proportional to rate of change or the time integration of a quantity, and any type of means may be employed for obtaining these voltages.

While I have described my invention in its preferred embodiments it is to be understood that the words which I have used are words of description rather than of limitation and that changes within the purview of the appended claims may be made without departing from the true scope and spirit of my invention in its broader aspects.

What is claimed is:

1. A motor control system comprising a motor, means for controlling the rate and direction of operation of said motor in accordance with a signal voltage, means for producing a voltage proportional to a time integration of the torque developed by said motor, and means for supplying said torque integral voltage in regenerative fashion to said motor control means.

2. A motor control system comprising a motor and generator for controlling the rate and direction of operation of said motor, a source of control signal for controlling the output of said generator, an impedance connected in series with the armature of said motor and said generator and adapted to have a voltage developed thereacross proportional to motor torque, integrating means responsive to the voltage so developed across said impedance supplying a voltage proportional to a time integration of said torque voltage, and means for controlling the output of said generator by said control signal and in regenerative fashion by said integration voltage.

3. A motor control system comprising a motor and a generator for controlling the speed and direction of operation of said motor, a source of control signal for controlling the output of said generator, an impedance connected in series with the armature of said motor and said generator, means for differentiating the voltage across said impedance, means for integrating the voltage across said impedance, and means responsive to said control signal and to the integration and differentiation voltage components for controlling the output of said generator.

4. A motor control system comprising a motor and a generator for controlling the rate and direction of operation of said motor, a signal source, means for controlling the output of said generator in accordance with said signal, an impedance connected in series with the armature of said motor and said generator, a resistance-capacitance network connected to receive the voltage developed across said impedance, and circuit means connected with the output of said network and with said control means for further controlling the output of said generator, said network being so constructed, correlated and arranged and the component elements thereof being of such values as to supply a time derivative voltage and an integration voltage across the output thereof, and said circuit means being connected to supply said derivative voltage in a degenerative sense and said integration voltage in a regenerative sense to said control means.

5. A motor control system comprising a motor and a generator for controlling the rate and direction of operation of said motor, a control signal source, an amplifier connected in controlling relation to said generator and adapted to control the output thereof in response to said control signal, an impedance connected in series with the armature of said motor and with said generator, a resistance-capacitance network connected across said impedance, and means connecting the output of said network with said amplifier, said network being so constructed and arranged and the values of resistance and capacitance therein being such as to supply voltage outputs proportional to a time derivative and a time integration of the voltage across said impedance, the derivative voltage across the network output being supplied to the amplifier in a degenerative sense and the integration voltage component being supplied to said amplifier in a regenerative sense.

6. A motor control system comprising a motor and a generator for controlling the rate and direction of operation of said motor, a signal source, means for controlling the output of said generator in accordance with said signal, an impedance in series with the armature of said motor, a resistance-capacitance network connected to receive the voltage developed across said impedance, and circuit means connected with the output of said network and with said control means for further controlling the output of said generator, the component elements of said network being of such values as to supply a time derivative voltage and an integration voltage across the output thereof and including a common capacitance for supplying both the time derivative and time integral voltage components, and said circuit means being connected to supply said derivative voltage in a degenerative sense and said integration voltage in a regenerative sense to said control means.

7. A motor control system comprising a motor, a signal source, means for controlling the rate and direction of operation of said motor in accordance with said signal, means for producing a voltage proportional to the torque developed by said motor, resistance-capacitance networks connected across said voltage-producing means, the components of said networks being of such values as to produce voltage components in the outputs thereof proportional to time rate of change of motor torque and to a time integration of motor torque, said differentiating and integrating networks including a common capacitance for supplying both the time derivative and time integral voltage components, and a lead connecting one side of said capacitance with said motor controlling means whereby further to control the operation of said motor in a regenerative sense in accordance with torque integral and in a degenerative sense in accordance with rate of change of torque.

8. A motor control system comprising a motor, a generator for controlling the speed of said motor, an impedance in series with the armature of said motor, and differentiating means including a differentiating impedance-reactance network connected to receive the voltage across said impedance for controlling the output of said generator according to the rate of change of the torque of said motor.

9. A motor control system comprising a motor, a generator for controlling the speed of said motor, an impedance in series with the armature of said motor, a differentiating impedance-reactance network connected across said impedance for producing a voltage corresponding to the rate of change of the torque of said motor, and a degenerative circuit connecting the output of said differentiating network to control the output of said generator according to the rate of change of the torque of said motor.

10. A motor control system comprising a motor, a generator for controlling the speed of said motor, an impedance in series with the armature of said motor, a differentiating impedance-reactance circuit connected across said impedance for producing a voltage corresponding to the rate of change of the torque of said motor, a regenerative feedback circuit responsive to the voltage across said impedance for controlling the output of said generator, and a feedback circuit for supplying the output of said differentiating circuit in degenerative fashion to control the output of said generator.

11. A motor control system comprising a motor, a generator for controlling the speed of said motor, an impedance in series with the armature of said motor, means for integrating the voltage developed across said impedance, a regenerative feedback circuit responsive to the integration voltage for controlling the output of said generator, a speed generator driven by said motor for producing a voltage corresponding to the speed of said motor, and a degenerative circuit responsive to the voltage of said speed generator for further controlling the output of said first-named generator.

12. A motor control system comprising a motor, a generator for controlling the speed of said motor, an impedance in series with the armature of said motor, an impedance-reactance differentiating circuit responsive to the voltage across said impedance for producing a voltage corresponding to the rate of change of the torque of said motor, a speed generator driven by said motor for producing a voltage corresponding to the speed of said motor, and a feedback circuit for controlling said generator in a regenerative sense according to the voltage across said impedance and in a degenerative sense according to the output voltages of said speed generator and said differentiating circuit.

13. A motor control system comprising a motor, an amplifier having an input for receiving a signal, a generator responsive to said amplifier for controlling the speed of said motor according to said signal, an impedance in series with the armature of said motor, means for integrating the voltage developed across said impedance, and a regenerative circuit for supplying the integration voltage to said amplifier.

14. A motor control system comprising a motor, an amplifier having an input for receiving a signal, a generator responsive to said amplifier for controlling the speed of said motor according to said signal, an impedance in series with the armature of said motor, a differentiating impedance-reactance circuit connected across said impedance for producing a voltage corresponding to the rate of change of the torque of said motor, and a degenerative feedback circuit connecting the output of said differentiating circuit to said amplifier.

15. A motor control system comprising a motor, an amplifier having an input for receiving a signal, a generator responsive to said amplifier for controlling the speed of said motor according to said signal, an impedance in series with the armature of said motor, a regenerative feedback circuit for supplying the voltage across said impedance to said amplifier, and a differentiating impedance-reactance circuit for obtaining a voltage proportional to the rate of change of the voltage across said impedance and for supplying it in a degenerative sense to said amplifier.

16. A motor control system comprising a motor, means for controlling the rate and direction of operation of said motor in accordance with a signal, means for producing a voltage proportional to the torque developed by said motor, means including an impedance-reactance network connected to receive said torque voltage, the impedance and reactance values being such as to supply a voltage across said impedance proportional to the rate of change of torque developed by said motor, and circuit means for supplying said rate of change of torque voltage in degenerative fashion to control said motor.

17. A motor control system comprising a motor, means for controlling the rate and direction of operation of said motor in accordance with a signal, means for producing a signal proportional to the torque developed by said motor, means for integrating said torque signal to provide a signal proportional to a time integration of the motor torque, and means for controlling said motor in regenerative fashion by said last mentioned signal.

18. A motor control system comprising a motor and a generator for controlling the rate and direction of operation of said motor, a source of control signal for controlling the output of said generator, an impedance connected in series with the armature of said motor and said generator and adapted to have a voltage developed thereacross proportional to motor torque, means including an impedance-reactance network connected to receive said torque voltage and for supplying a voltage proportional to the rate of change of torque, and means for controlling the output of said generator by said control signal and in degenerative fashion by said voltage proportional to rate of change of torque.

19. A motor control system comprising a motor, means for controlling the rate and direction of operation of said motor in accordance with a signal, means for producing a voltage proportional to the torque developed by said motor, means for differentiating said torque voltage, means for integrating said torque voltage, and means for applying the differential voltage and the integral voltage in controlling relation to said motor controlling means, said differential voltage being applied to said control means in a degenerative sense, and said integral voltage being applied to said control means in a regenerative sense.

20. A motor control system comprising a motor, a generator for controlling the speed of said motor, an impedance in series with the armature of said motor, an impedance-reactance network connected to receive the voltage developed across said impedance and for integrating said voltage, a regenerative feedback circuit responsive to the integration voltage for controlling the output of said generator, means for producing a voltage corresponding to the speed of said motor, and a degenerative circuit responsive to said speed voltage for further controlling said generator.

21. A motor control system comprising a motor, means for controlling the rate and direction of operation of said motor in accordance with a control signal, a control signal source connected with said motor control means, means for producing a signal proportional to a time integration of the torque developed by said motor, and means for supplying said torque integral signal in regenerative fashion to said motor control means.

22. A motor control system comprising a motor, means for controlling the rate and direction of operation of said motor in accordance with a control signal, a control signal source connected with said motor control means, means for producing a signal proportional to the torque developed by said motor, means for supplying a signal proportional to a time integration of said torque signal, and means for supplying said torque signal and said torque integration signal in regenerative fashion to said motor control means.

23. A motor control system comprising a motor, means for controlling the rate and direction of operation of said motor in accordance with a control signal, a control signal source connected with said motor control means, means for producing a signal proportional to the torque developed by said motor, means for differentiating said torque signal, means for integrating said torque signal, and means for supplying the derivative signal and the integral signal in controlling relation to said motor controlling means, said derivative signal being applied to said motor control means in a degenerative fashion and said integral signal being supplied to said motor control means in regenerative fashion.

24. A motor control system comprising a motor, means for controlling the rate and direction of operation of said motor in accordance with a control signal, a control signal source connected with said motor control means, means for producing a signal proportional to the torque developed by said motor, means for supplying a signal proportional to a time derivative and a time integral of said torque signal, means for supplying said torque signal, torque derivative signal and the torque integral signal in controlling relation to said motor control means, said torque signal and torque integral signal being supplied to said motor control means in regenerative fashion and said torque derivative signal being supplied to said motor control means in a degenerative sense.

25. A motor control system comprising a motor and a generator for controlling the speed and direction of said motor, means for controlling the output of said generator in accordance with a control signal, a source of control signal connected with said generator control means, an impedance connected in series with the armature of said motor and said generator for providing a voltage thereacross proportional to motor torque, means for supplying a voltage proportional to a time integral of the voltage across said impedance, and means for supplying said torque voltage and integral voltage in regenerative fashion to said generator control means.

RAWLEY D. McCOY.

REFERENCES CITED

The following references are of record in the file of this patent:

UNITED STATES PATENTS

| Number | Name | Date |
|---|---|---|
| 2,175,009 | Anderson | Oct. 3, 1939 |
| 2,237,015 | Stratton | Apr. 1, 1941 |
| 2,238,810 | Crever | Apr. 15, 1941 |
| 2,356,152 | Edwards et al. | Aug. 22, 1944 |